United States Patent
Lee et al.

(10) Patent No.: US 11,987,496 B2
(45) Date of Patent: May 21, 2024

(54) METHOD FOR PRODUCING BIS(FLUOROSULFONYL)IMIDE LITHIUM SALT (LiFSI) WITH REDUCED FLUORINE ANION CONTENT BY USING ALKOXY TRIALKYL SILANE

(71) Applicant: DAEGU CATHOLIC UNIVERSITY INDUSTRY ACADEMIC COOPERATION FOUNDATION, Gyeongsan-si (KR)

(72) Inventors: Sang Ryul Lee, Chungju-si (KR); Kyoung Chol Kim, Chungju-si (KR); Ja Young Park, Chungju-si (KR); Ji Hyeong Kim, Chungju-si (KR); Jeong In Kim, Chungju-si (KR); Seok Ju Lee, Daegu (KR); Jongyun Jang, Uiseong-gun (KR); Seongjeong Lee, Daegu (KR); Mingi Chu, Daegu (KR); Dong Wook Kang, Seoul (KR)

(73) Assignee: DAEGU CATHOLIC UNIVERSITY INDUSTRY ACADEMIC COOPERATION FOUNDATION, Gyeongsan-si (KR)

( * ) Notice: Subject to any disclaimer, the term of this patent is extended or adjusted under 35 U.S.C. 154(b) by 594 days.

(21) Appl. No.: 17/274,539

(22) PCT Filed: Sep. 4, 2019

(86) PCT No.: PCT/KR2019/011415
§ 371 (c)(1),
(2) Date: Mar. 9, 2021

(87) PCT Pub. No.: WO2020/055033
PCT Pub. Date: Mar. 19, 2020

(65) Prior Publication Data
US 2021/0347639 A1   Nov. 11, 2021

(30) Foreign Application Priority Data
Sep. 11, 2018 (KR) .................. 10-2018-0108231

(51) Int. Cl.
*C01B 21/086* (2006.01)
*C01B 21/093* (2006.01)

(52) U.S. Cl.
CPC .......... *C01B 21/086* (2013.01); *C01B 21/093* (2013.01)

(58) Field of Classification Search
None
See application file for complete search history.

(56) References Cited

U.S. PATENT DOCUMENTS

| | | | | |
|---|---|---|---|---|
| 2013/0068991 A1* | 3/2013 | Sato | ............... | H01G 9/035 |
| | | | | 423/386 |
| 2013/0323154 A1 | 12/2013 | Tsubokura et al. | | |
| 2014/0075746 A1 | 3/2014 | Schmidt | | |
| 2018/0370799 A1 | 12/2018 | Lim | | |

FOREIGN PATENT DOCUMENTS

| | | | |
|---|---|---|---|
| JP | 2011-148707 A | | 8/2011 |
| KR | 10-2013-0028950 A | | 3/2013 |
| KR | 10-2013-0114713 A | | 10/2013 |
| KR | 20130114713 A | * | 10/2013 |
| KR | 10-2013-0140216 A | | 12/2013 |
| KR | 10-2016-0073063 A | | 6/2016 |
| KR | 10-1718292 B1 | | 3/2017 |
| KR | 101718292 B1 | * | 3/2017 |
| KR | 10-1982601 B1 | | 5/2019 |

OTHER PUBLICATIONS

Schaetz A, Zeltner M, Michl TD, Rossier M, Fuhrer R, Stark WJ. Magnetic silyl scaffold enables efficient recycling of protecting groups. Chemistry. Sep. 12, 2011;17(38):10566-73. doi: 10.1002/chem.201101165 (Year: 2011).*
English translation of KR101718292B1 Description (Year: 2017).*
English translation of KR 20130114713A Description (Year: 2013).*
International Search Report for PCT/KR2019/011415 dated Dec. 12, 2019 (PCT/ISA/210).

* cited by examiner

*Primary Examiner* — Anthony J Zimmer
*Assistant Examiner* — Zachary John Baum
(74) *Attorney, Agent, or Firm* — Sughrue Mion, PLLC

(57) ABSTRACT

A method for producing a bis(fluorosulfonyl)imide lithium salt is disclosed. The method includes the steps of: (a) reacting bis(chlorosulfonyl)imide with $NH_4F(HF)n$ (n=0-10) to prepare ammonium bis(fluorosulfonyl)imide; and (b) reacting the ammonium bis(fluorosulfonyl)imide with a lithium base, wherein in at least one of steps (a) and (b), after the reaction, a process of adding an alkoxy trialkyl silane to the reaction solution to remove a fluorine anion is performed.

8 Claims, No Drawings

METHOD FOR PRODUCING BIS(FLUOROSULFONYL)IMIDE LITHIUM SALT (LiFSI) WITH REDUCED FLUORINE ANION CONTENT BY USING ALKOXY TRIALKYL SILANE

CROSS REFERENCE TO RELATED APPLICATIONS

This application is a National Stage of International Application No. PCT/KR2019/011415 filed Sep. 4, 2019 claiming priority based on Korean Patent Application No. 10-2018-0108231 filed on Sep. 11, 2018, the entire contents of which are incorporated herein by reference.

TECHNICAL FIELD

The present invention relates to a method for producing a bis(fluorosulfonyl)imide lithium salt (LiFSI) with reduced content of fluorine anions.

BACKGROUND ART

As the popularization of mobile devices, the commercialization of electric vehicles, and the demand for electrical storage devices are increased, secondary batteries with high power, high energy density, and high discharge voltage are being developed.

Lithium-ion batteries comprise at least a negative electrode, a positive electrode, a separator, and an electrolyte. The electrolyte generally consists of lithium salt dissolved in a solvent, which is a mixture of organic carbonates. Lithium hexafluorophosphate (LiPF$_6$) is the most widely used lithium salt. This lithium salt has excellent performance, but has a disadvantage of decomposing into a gaseous form of hydrofluoric acid.

In order to overcome the above drawbacks, LiTFSI (lithium bis (trifluoromethanesulfonyl) imide) and LiFSI (lithium bis (fluorosulfonyl) imide) have been developed. These salts show little or no spontaneous degradation and are more stable to hydrolysis than LiPF$_6$.

On the other hand, LiTFSI is known to have a disadvantage of causing corrosion to an aluminum current collector, whereas LiFSI is attracting attention for its excellent performance compared to other conventional salts since it does not have the above disadvantages.

Since the proportion of lithium salt is high in the cost structure of a lithium-ion secondary battery, research on a method of economically manufacturing high-purity bis(fluorosulfonyl)imide lithium salt is being actively conducted.

The method known in the art for producing bis(fluorosulfonyl)imide lithium salt is carried out as follows:

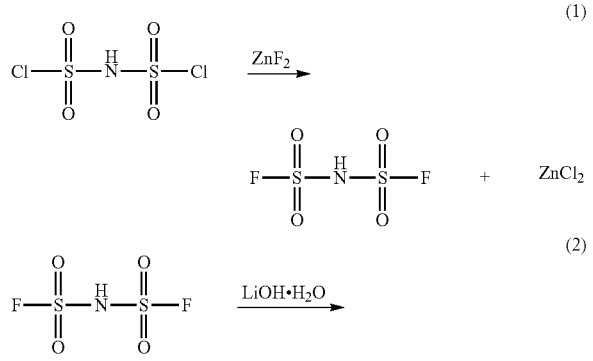

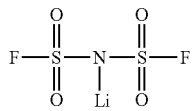

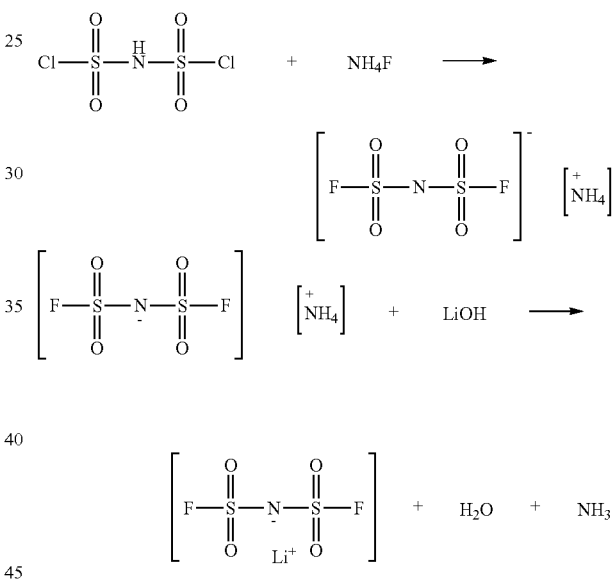

As shown in the reaction scheme, the production method has a characteristic of producing the bis(fluorosulfonyl) imide compound by reacting bis(chlorosulfonyl)imide with zinc (II) fluoride (ZnF$_2$) in step (1).

However, the above reaction has disadvantages that expensive zinc (II) fluoride must be used, poorly soluble zinc components should be removed, and a large amount of wastewater containing zinc is produced. In particular, in order to use bis(fluorosulfonyl)imide lithium salt in the electrolyte solution, there is a disadvantage that zinc metal has to be adjusted in unit of PPM.

In addition, a method for producing bis(fluorosulfonyl) imide lithium salt carried out as follows is also known.

As shown in the reaction scheme, the technology is characterized by producing ammonium bis(fluorosulfonyl) imide salt as an intermediate product by reacting bis(chlorosulfonyl)imide, a starting material, with NH$_4$F(HF)n (n=1~10), a fluorination reagent.

However, the above method has a disadvantage that fluorine anions (F$^-$) is generated in the process of producing ammonium bis(fluorosulfonyl)imide salt by reacting bis (chlorosulfonyl)imide with NH$_4$F(HF)n (n=1~10), a fluorinating reagent, which acts as a cause of deteriorating product quality.

Various adsorbents are used to remove fluorine anions (F$^-$) as described above, but there is a disadvantage that since most of them are solid adsorbents, the number of processes is increased in the process of actual use and other impurities are generated, which are inefficient.

Therefore, research on a method capable of efficiently removing fluorine anions generated in the preparation process is required.

RELATED ART DOCUMENT

Patent Document

Korean Laid-open Patent Publication No. 10-2013-0140216

DISCLOSURE

Technical Problem

In order to solve the above problems of the prior art, the present inventors have found a method capable of very efficiently removing fluorine anions (F⁻) generated in the preparation process of bis(fluorosulfonyl)imide lithium salt using a novel adsorbent, as a result of diligent efforts, and completed the present invention.

Therefore, it is an object of the present invention to provide a method of producing a bis(fluorosulfonyl)imide lithium salt, which is capable of very efficiently removing fluorine anions (F⁻) generated in the preparation process of the bis(fluorosulfonyl)imide lithium salt using a novel adsorbent.

In addition, it is another object of the present invention to provide a method for producing a bis (fluorosulfonyl) imide lithium salt, which is capable of providing high-quality bis (fluorosulfonyl) imide lithium salt by sufficiently removing fluorine anions (F⁻) by a simple method.

Technical Solution

In order to achieve the above objects, the present invention provides a method for producing a bis(fluorosulfonyl) imide lithium salt, comprising the steps of:
(a) reacting bis(chlorosulfonyl)imide with NH$_4$F(HF)n (n=0-10) to prepare ammonium bis(fluorosulfonyl)imide; and
(b) reacting the ammonium bis(fluorosulfonyl)imide with a lithium base,
wherein in at least one of steps (a) and (b), after the reaction, a process of adding an alkoxy trialkyl silane to the reaction solution to remove a fluorine anion is performed.

In an embodiment of the present invention, the production method may be characterized by performing:
(1) a step of adding and stirring alkoxy trialkyl silane to the reaction solution, after the reaction in step (a);
(2) a step of adding and stirring alkoxy trialkyl silane to the reaction solution, after the reaction in step (b); or
both of steps (1) and (2) above.

Advantageous Effects

The production method of bis(fluorosulfonyl)imide lithium salt of the present invention provides an effect of very efficiently removing fluorine anions (F⁻) generated in the preparation process of bis(fluorosulfonyl)imide lithium salt by using a novel alkoxy trialkyl silane adsorbent.

In addition, the present invention provides an effect of providing bis(fluorosulfonyl)imide lithium salt with high-quality by sufficiently removing fluorine anions (F⁻) by a simple method as described above.

BEST MODE

Hereinafter, the present invention will be described in detail.

The present invention relates to a method for producing a bis(fluorosulfonyl)imide lithium salt, comprising the steps of:
(a) reacting bis(chlorosulfonyl)imide with NH$_4$F(HF)n (n=0-10) to prepare ammonium bis(fluorosulfonyl)imide; and
(b) reacting the ammonium bis(fluorosulfonyl)imide with a lithium base, wherein in at least one of steps (a) and (b), after the reaction, a process of adding an alkoxy trialkyl silane to the reaction solution to remove a fluorine anion is performed.

In the process of producing bis(fluorosulfonyl)imide lithium salt, various adsorbents are used to remove fluorine anions (F⁻), and most of them are adsorbents in solid form. However, the adsorbents in the solid form increase the number of processes in the actual use process, and generate other impurities, and thus they have the disadvantage of being inefficient. In addition, known liquid adsorbents have an inefficient effect of removing fluorine anions, and there was a problem that it was not easy to separate them from the reaction solution.

The alkoxy trialkyl silane used in the present invention can very efficiently remove fluorine anion in the preparation process of bis(fluorosulfonyl)imide lithium salt, by forming a strong bond with fluorine anion and thus easily removing fluorine anion by a chemical method, as shown in Reaction Scheme 1 below.

Chemically, since the adsorptive power between Si and F is much greater than that between Si and O, alkoxy trialkyl silane is used for the deprotection reaction of silyl ether. Therefore, as shown in the following Reaction Scheme, if a reagent such as methoxytrimethylsilane is used, the concentration of fluorine anions generated in the preparation process of LiFSI can be significantly reduced.

[Reaction Scheme 1]

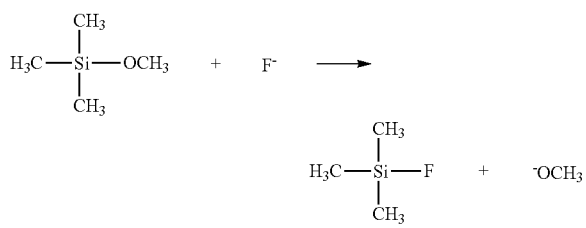

As used herein, the term "alkyl" may be an alkyl group having 1 to 5 carbon atoms, and may be, for example, methyl, ethyl, propyl, or butyl.

As used herein, the term "alkoxy" may be an alkoxy group having 1 to 4 carbon atoms, and may be, for example, methoxy, ethoxy, propoxy, butoxy, or the like.

In the present invention, the alkoxy trialkyl silane may be added in an amount of 0.01 to 10 equivalents per 1 equivalent of fluorine anion (F⁻) generated after the reaction, more preferably in an amount of 0.05 to 10 equivalents. If the alkoxy trialkyl silane is contained in the range as described above, it is preferable because it can sufficiently remove fluorine anions.

In one embodiment of the present invention, the process of removing the fluorine anions may be achieved by performing, (1) a step of adding and stirring alkoxy trialkyl silane to the reaction solution, after the reaction in step (a);

(2) a step of adding and stirring alkoxy trialkyl silane to the reaction solution, after the reaction in step (b); or both of steps (1) and (2) above.

In the case of performing step (1) or step (2) above, after the reaction is terminated, a bubbling process may be further performed by supplying nitrogen gas to the reactant until the pH of the flowing gas is 6 to 8.

The bubbling of the nitrogen gas should be carried out by supplying nitrogen gas to the reactant until the pH of the flowing gas is 6 to 8, so that the desired effect can be obtained.

That is, when the pH of the flowing gas is less than 6, when the bubbling of the nitrogen gas is stopped, the HF removal rate is in a low state. If the pH of the flowing gas exceeds 8, the amount of HF in the reactant may increase even more than when the nitrogen gas is not bubbled.

It is more preferable to stop the bubbling of the nitrogen gas when the pH becomes 6.5 to 7.5, and even more preferably to stop the bubbling of the nitrogen gas when the pH becomes 6.8 to 7.2.

In step (b), the pH of the flowing gas can be measured using a pH paper, but is not limited to this method, and may also be measured by a method known in the art.

Step (2) is preferably carried out after the first concentration of the reaction product of step (b) in order to efficiently remove the fluorine anions ($F^-$) generated during the reaction.

After the reaction in step (2) is terminated, a second concentration process may be further performed while supplying nitrogen gas to the reactant.

In the production method of the present invention, the alkoxy trialkyl silane may be at least one selected from methoxytrimethylsilane and ethoxytriethylsilane.

The processes of steps (a) and (b) are not particularly limited in the present invention, and may be performed by methods known in the art.

Step (a) is a step of reacting bis(chlorosulfonyl)imide with $NH_4F(HF)n$ (n=0~10) to prepare bis(fluorosulfonyl)imide, which can be represented by Reaction Scheme 2 below:

[Reaction Scheme 2]

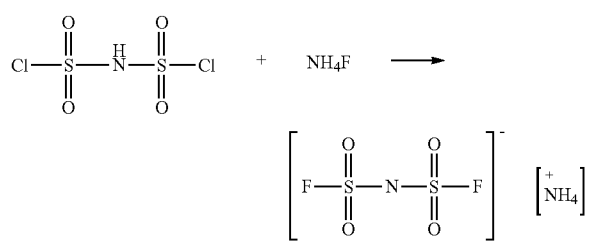

In the above reaction, the solvent may comprise diethyl ether, diisopropyl ether, methyl-t-butyl ether, methyl acetate, ethyl acetate, propyl acetate, butyl acetate, pentane, hexane, heptane and the like, and these may be used alone or in combination of two or more. Among these, butyl acetate can be more preferably used.

The reaction may be carried out under a nitrogen atmosphere.

In step (a), after bubbling nitrogen gas, filtration and concentration may be performed to obtain a crude compound. At this time, recrystallization may be performed by adding methylene chloride and the like together with a solvent to the crude compound.

Step (b) may be carried out as shown in Reaction Scheme 3 below:

[Reaction Scheme 3]

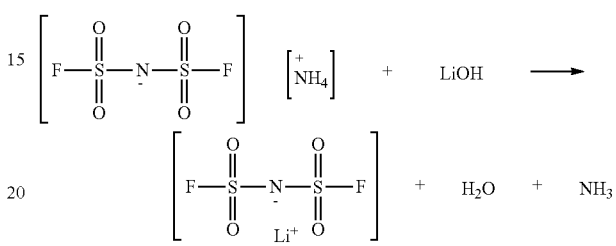

In the above reaction of step (b), the solvent may comprise diethyl ether, diisopropyl ether, methyl-t-butyl ether, methyl acetate, ethyl acetate, propyl acetate, butyl acetate, pentane, hexane, heptane and the like, and these may be used alone or in combination of two or more. Among these, butyl acetate can be more preferably used.

In step (b), the lithium base may be at least one selected from the group consisting of lithium hydroxide (LiOH), lithium hydroxide hydrate ($LiOH \cdot H_2O$), lithium carbonate ($Li_2CO_3$), lithium hydrogen carbonate ($LiHCO_3$), lithium chloride (LiCl), lithium acetate ($LiCH_3COO$), and lithium oxalate ($Li_2C_2O_4$). Among these, lithium hydroxide hydrate can be preferably used.

In step (b), after mixing the reactant, bubbling of nitrogen gas may be further performed.

In step (b), washing, filtration concentration, recrystallization, and the like of the obtained compound may be further carried out by a conventional method.

Hereinafter, preferred examples are presented to aid in the understanding of the present invention, but the following examples are only illustrative of the present invention, and it is obvious to those skilled in the art that various changes and modifications can be made within the scope and spirit of the present invention, and it is natural that such changes and modifications fall within the scope of the appended claims.

Example 1: Preparation of bis(fluorosulfonyl)imide lithium salt 58.83 g of anhydrous ammonium fluoride from which water was purified and 300 g of butyl acetate were charged into a reactor equipped with a stirring device, a condenser, and a thermometer at room temperature under a nitrogen atmosphere. 100 g of bis(dichlorosulfonyl)imide was slowly added thereto, while stirring the mixture, and then reacted for 2 hours while raising the temperature to 80° C. After completion of the reaction, the temperature of the reactant was lowered to room temperature, filtered, and concentrated to obtain 83.32 g of a crude compound.

After 111.10 g of butyl acetate was added to the crude compound and stirred, 583.26 g of methylene chloride was added, recrystallized, and filtered, and then the solid was vacuum-dried for at least 2 hours to obtain 74.06 g of ammonium bis(fluorosulfonyl)imide (yield: 80%).

74.06 g of ammonium bis(fluorosulfonyl)imide and 444.39 g of butyl acetate were added to reactor 1 and stirred. 41.96 g of LiOH·H$_2$O and 220.63 g of butyl acetate were added to reactor 2 and stirred. The solution of reactor 1 was slowly added dropwise to reactor 2. After completion of the reaction, the temperature of the reactant was lowered to room temperature, filtered, and first concentrated.

50.0 g of the first concentrate was added to a 500 mL 3-neck RBF, 0.51 mL (384 mg) of methoxytrimethylsilane was added, and the mixture was stirred at room temperature for 1 hour. The reaction mixture was kept at an internal temperature of 50 to 60° C., and concentrated under reduced pressure while blowing nitrogen (secondary concentration).

200 g of toluene was added to the secondary concentrate, followed by stirring at room temperature for 20 minutes. The resulting solid was filtered and dried under vacuum to obtain 17.5 g of bis(fluorosulfonyl)imide lithium salt (yield: 62%).

Example 2: Preparation of bis(fluorosulfonyl)imide lithium salt 17.0 g of bis(fluorosulfonyl)imide lithium salt was obtained by performing the same method as in Example 1, except that 1.01 mL (760 mg) of methoxytrimethylsilane was used instead of 0.51 mL (384 mg) of methoxytrimethylsilane (yield: 60%).

Example 3: Preparation of bis(fluorosulfonyl)imide lithium salt 18.0 g of bis(fluorosulfonyl)imide lithium salt was obtained by performing the same method as in Example 1, except that 5.07 mL (3.84 g) of methoxytrimethylsilane was used instead of 0.51 mL (384 mg) of methoxytrimethylsilane (yield: 64%).

Comparative Example 1: Preparation of bis(fluorosulfonyl)imide lithium salt 17.7 g of bis(fluorosulfonyl)imide lithium salt was obtained by performing the same method as in Example 1, except that methoxytrimethylsilane was not used (yield: 63%).

Experimental Example 1: Measurement of the Concentration of Fluorine Anions (F$^-$) Contained in bis(fluorosulfonyl)imide lithium salt The concentration of fluorine anions (F–) from the bis(fluorosulfonyl)imide lithium salt prepared in Examples 1 to 3 and Comparative Example 1 was measured using an F ion meter of Metrohm company. The measurement results of the concentration of the fluorine anions (F$^-$) are shown in Table 1 below.

TABLE 1

| Measured sample | Whether and how much methoxytrimethyl silane is used | Measurement mV | Amount of sample injected (g) | Concentration of the measured sample (ppm) | Concentration of fluorine anions (F$^-$) (ppm) | Remarks (fluorine anions) |
|---|---|---|---|---|---|---|
| Experimental Example 1 | Methoxytrimethyl silane was not used | 88.1 | 1.0332 | 87.4 | 87.4 | — |
| Example 1 | Use of 384 mg of methoxytrimethyl silane in step (b) | 88.9 | 1.1682 | 74.9 | 74.9 | 14.3% reduction |
| Example 2 | Use of 760 mg of methoxytrimethyl silane in step (b) | 154.8 | 1.2000 | 5.1 | 5.1 | 94.2% reduction |
| Example 3 | Use of 3.84 g of methoxytrimethyl silane in step (b) | 161.7 | 1.2363 | 3.7 | 3.7 | 95.8% reduction |

As shown in Table 1, in the case of the bis(fluorosulfonyl) imide lithium salt of Examples 1 to 3 in which fluorine anions were removed using methoxytrimethylsilane, the concentration of fluorine anions was significantly reduced as compared with Experimental Example 1 without treatment with methoxytrimethylsilane. In particular, it was confirmed that the content of fluorine anions is inversely proportional to the amount of methoxytrimethylsilane used and Examples 2 and 3, which increased the amount of methoxytrimethylsilane used, showed more remarkable effects.

Therefore, this fact indicates that the alkoxy trialkyl silane of the present invention can very effectively remove fluorine anions.

The invention claimed is:

1. A method for producing a bis(fluorosulfonyl)imide lithium salt, comprising the steps of:
    (a) reacting bis(chlorosulfonyl)imide with $NH_4F(HF)_n$ (n=0-10) to prepare ammonium bis(fluorosulfonyl)imide;
    (b) reacting the ammonium bis(fluorosulfonyl)imide with a lithium base, following by a first concentration process to give a first concentrate comprising a fluorine anion ($F^-$); and
    (c) adding an alkoxy trialkyl silane to the first concentrate to remove or reduce the fluorine anion.

2. The method for producing the bis(fluorosulfonyl)imide lithium salt according to claim 1, wherein the alkoxy trialkyl silane is added in an amount of 0.01 to 10 equivalents per 1 equivalent of the fluorine anions ($F^-$) generated in step (b).

3. The method for producing the bis(fluorosulfonyl)imide lithium salt according to claim 1, further comprising, after the step (a) and before the step (b), adding alkoxy trialkyl silane to a reaction solution under stirring.

4. The method for producing the bis(fluorosulfonyl)imide lithium salt according to claim 3, further comprising, after the step of adding the alkoxy trialkyl silane to the reaction solution, supplying nitrogen gas to the reaction solution to generate gas bubbles until a pH of a nitrogen gas flow supplied to the reaction solution becomes 6 to 8.

5. The method for producing the bis(fluorosulfonyl)imide lithium salt according to claim 1, further comprising, after the step (c), performing a secondary concentration process while supplying nitrogen gas to the reaction solution.

6. The method for producing the bis(fluorosulfonyl)imide lithium salt according to claim 1, wherein the alkoxy trialkyl silane is methoxytrimethylsilane, ethoxytriethylsilane, or a combination thereof.

7. The method for producing the bis(fluorosulfonyl)imide lithium salt according to claim 1, wherein in the steps (a) and (b) are carried out in a solution, wherein a solvent for the steps (a) and (b) is independently selected from the group consisting of diethyl ether, diisopropyl ether, methyl-t-butyl ether, methyl acetate, ethyl acetate, propyl acetate, butyl acetate, pentane, hexane, heptane, and a combination thereof.

8. The method for producing the bis(fluorosulfonyl)imide lithium salt according to claim 1, wherein the lithium base in step (b) is selected from the group consisting of lithium hydroxide (LiOH), lithium hydroxide hydrate ($LiOH \cdot H_2O$), lithium carbonate ($Li_2CO_3$), lithium hydrogen carbonate ($LiHCO_3$), lithium chloride (LiCl), lithium acetate ($LiCH_3COO$), lithium oxalate ($Li_2C_2O_4$), and a combination thereof.

* * * * *